US011597120B2

(12) United States Patent
Martinez

(10) Patent No.: US 11,597,120 B2
(45) Date of Patent: Mar. 7, 2023

(54) CONVERTING PLASTIC BAGS TO A RECYCLABLE FORM

(71) Applicant: Eric Benjamin Martinez, Boise, ID (US)

(72) Inventor: Eric Benjamin Martinez, Boise, ID (US)

(*) Notice: Subject to any disclaimer, the term of this patent is extended or adjusted under 35 U.S.C. 154(b) by 938 days.

(21) Appl. No.: 16/204,935

(22) Filed: Nov. 29, 2018

(65) Prior Publication Data

US 2019/0160709 A1 May 30, 2019

Related U.S. Application Data

(60) Provisional application No. 62/592,187, filed on Nov. 29, 2017.

(51) Int. Cl.
*B29B 17/00* (2006.01)
*B09B 3/40* (2022.01)
*B29K 105/26* (2006.01)
*B29K 23/00* (2006.01)

(52) U.S. Cl.
CPC ........... *B29B 17/0042* (2013.01); *B09B 3/40* (2022.01); *B29K 2023/065* (2013.01); *B29K 2023/0633* (2013.01); *B29K 2105/26* (2013.01)

(58) Field of Classification Search
None
See application file for complete search history.

(56) References Cited

U.S. PATENT DOCUMENTS

| | | | | |
|---|---|---|---|---|
| 3,551,644 | A | * | 12/1970 | Yoshiaki ............ G05D 23/1919 219/521 |
| 4,410,791 | A | | 10/1983 | Eastep |
| 4,441,016 | A | | 4/1984 | Oota et al. |
| 4,592,721 | A | | 6/1986 | Chariebois et al. |
| 5,251,542 | A | | 10/1993 | Itoh et al. |
| 5,549,039 | A | | 8/1996 | Ito et al. |
| 5,740,725 | A | * | 4/1998 | Tomizawa ............ B30B 9/3017 100/92 |

(Continued)

OTHER PUBLICATIONS

Lenkiewicz et al, "Making Waste Work: A Toolkit," Wasteaid, Oct. 2017, 16 pages.

(Continued)

*Primary Examiner* — Mohammad M Ameen
(74) *Attorney, Agent, or Firm* — Fish & Richardson P.C.

(57) ABSTRACT

Techniques for converting plastic bags to a recyclable form are described. In some implementations, a device includes an outer container having an outer lid, an inner container situated within the outer container having an opening, and one or more heating elements. The inner container has an inner lid configured to cover the inner container's opening, and the outer lid of the outer container is configured to close over the inner lid. In response to a user input to the device, a conversion cycle is initiated in which electric power is supplied to one or more heating elements so that the one or more heating elements raise the inner container's internal temperature to a target temperature and maintain the inner container's internal temperature at a minimum of the target temperature for a predetermined conversion time sufficient to convert one or more plastic bags within the inner container to a recyclable plastic block.

19 Claims, 8 Drawing Sheets

(56) References Cited

U.S. PATENT DOCUMENTS

| | | | |
|---|---|---|---|
| 8,690,090 | B2 | 4/2014 | Kulesa et al. |
| 2008/0286192 | A1 | 11/2008 | Hamby et al. |
| 2012/0261863 | A1 | 10/2012 | Alsewailem |
| 2013/0011537 | A1 | 1/2013 | Vahid |
| 2013/0240500 | A1* | 9/2013 | Alipour ................ A47J 27/004 |
| | | | 220/573.1 |
| 2014/0373729 | A1 | 12/2014 | Kim et al. |
| 2015/0083731 | A1* | 3/2015 | Skopis ................ A47J 36/022 |
| | | | 220/573.4 |
| 2016/0309961 | A1* | 10/2016 | Lonergan ................ A23L 5/17 |
| 2016/0324366 | A1 | 11/2016 | Wu et al. |

OTHER PUBLICATIONS

PCT International Search Report and Written Opinion in International Appln. No. PCT/US18/63098, dated Feb. 5, 2019, 14 pages.

Bainier, observers.france24.com [online], "Recycling plastic waste into paving stones in Cameroon," Jul. 4, 2016, retrieved on Oct. 18, 2021, retrieved from URL<https://observers.france24.com/en/20160407-cameroon-eco-business-recycle-africa>, 4 pages.

Lenkiewicz et al., wasteaid.org [online], "How to transform plastic waste into paving tiles A step-by-step guide," Oct. 2017, retrieved on Oct. 18, 2021, retireved from URL<https://wasteaid.org/wp-content/uploads/2017/10/8-How-to-transform-plastic-waste-into-paving-tiles-vl-mobile.pdf>, 16 pages.

* cited by examiner

CONVERTING PLASTIC BAGS TO A RECYCLABLE FORM

CROSS-REFERENCE TO RELATED APPLICATION

This application claims the benefit of the filing date of U.S. Provisional Application No. 62/592,187, which was filed on Nov. 29, 2017. The entire contents of U.S. Application No. 62/592,187 are incorporated herein by reference.

BACKGROUND

Recycling plants often find typical plastic bags difficult to recycle due to their light weight and the fact that such bags cannot be easily compacted. Plastic bags are often disposed of with household refuse, where they unnecessarily pollute the environment and pose a threat to wildlife.

SUMMARY

This application describes an apparatus and method for converting plastic bags into a more recyclable form, such as a plastic block that is more conducive to current recycling techniques. Certain implementations may provide various advantages.

A common concern that arises when heating plastic is the accompanying release of carcinogenic and other hazardous chemicals. The apparatus and method detailed in this application establish an apparatus conversion temperature slightly below the melting point of polymers that typically make up plastic bags, such as high-density polyethylene (HDPE), low-density polyethylene (LDPE), and/or linear LDPE. At temperatures just below its melting point, the polymer condenses, causing the plastic bags to be compacted and converted into the desired plastic block without melting and releasing unwanted harmful chemical byproducts. Additionally, the plastic block that results from certain implementations of the apparatus and method described herein will be more compact, occupy less space, and be more easily recycled, than typical plastic bags.

One aspect features a device that includes an outer container having an outer lid and inner container situated within the outer container having an opening. The inner container has an inner lid configured to cover the inner container's opening, and the outer lid of the outer container is configured to close over the inner lid. One or more heating elements are located between an exterior of the inner container and an interior of the outer container is configured to heat the interior of the inner container so that one or more plastic bags inside the inner container are converted to a plastic block. A control panel disposed to the exterior of the outer container or the exterior of the outer lid is configured to supply electric power to the one or more heating elements.

One or more of the following features may also be included.

In some implementations, the device includes an insulating material located in between the one or more heating elements and the outer container's interior and on the interior of the outer lid.

In some implementations, the walls of the inner container are substantially planar and formed of metal.

In some implementations, the inner container has a rectangular cross-section and is configured to shape plastic bags into a substantially rectangular block.

In some implementations, the inner container has a bottom and a plurality of sides extending upward from the bottom, wherein the one or more heating elements extend along the bottom and upward along a majority of the upward extent of the sides.

In some implementations, the device includes a removable silicone layer that lines the bottom and the walls of and inner container's interior.

In some implementations, the inner lid defines a slit that extends through the inner lid that provides a passage to the opening of the inner container.

In some implementations, the device has an outer lid sensor, located to detect whether the outer lid is closed, and an inner lid sensor, located to detect whether the inner lid is closed.

In some implementations, the one or more heating elements are configured to heat the interior of the inner container so that one or more plastic bags inside the inner container are converted to a plastic block only if the outer lid sensor detects that the outer lid is closed and the inner lid sensor detects that the inner lid is closed.

In some implementations, the device has an on/off control positioned to initiate and terminate the supply of electric power from the control panel to the one or more heating elements.

In some implementations, the device includes a timer, a temperature sensor, and a display screen disposed to the exterior of the device or the exterior of the control panel. The timer may be configured to measure the amount of time that elapses while electric power is supplied to the one or more heating elements and the amount of time that elapses while electric power is not being supplied to the one or more heating elements. The temperature sensor may be arranged to measure the temperature of the inner container.

In some implementations, a control unit of the control panel is configured to receive temperature data from the temperature sensor and, while electric power is being supplied to the one or more heating elements, cause the temperature of the inner container to be indicated on the display screen. The control unit of the control panel is configured, while electric power is being supplied to the one or more heating elements, to receive a set of time data from the timer and cause the amount of time that elapses while electric power is being supplied to the one or more heating elements to be indicated on the display screen. The control unit of the control panel is configured, while electric power is not being supplied to the one or more heating elements, to receive a second set of time data from the timer.

Another aspect features a method, which includes receiving one or more plastic bags in an inner container of a device that has an outer container in which the inner container is situated, one or more heating elements located between the exterior of the inner container and the interior of the outer container, and a control panel disposed to the exterior of the outer container or the exterior of the outer lid. In response to a user input to the device, a control unit of the control panel initiates a conversion cycle in which electric power is supplied to the one or more heating elements so that the one or more heating elements raise the inner container's internal temperature to a target temperature and maintains the inner container's internal temperature at a minimum of the target temperature for a predetermined conversion time sufficient to convert the one or more plastic bags inside the inner container to a recyclable plastic block. The control unit of the control panel terminates the supply of electric power to the one or more heating elements after the predetermined conversion time has elapsed.

In some implementations, the target temperature is one hundred seventy-five degrees Fahrenheit. Other temperatures can be used as discussed further below.

Another aspect includes a method that includes: receiving one or more plastic bags in an inner container of a device, wherein the device comprises: an outer container in which the inner container is situated; one or more heating elements located between the exterior of the inner container and the interior of the outer container; and a control panel disposed at an exterior of the outer container or the outer lid, wherein the control panel is in communication with a control unit configured to supply electric power to the heating element; in response to a user input to the device, initiating, by the control unit, a conversion cycle in which electric power is supplied to the one or more heating elements so that the one or more heating elements raise the inner container's internal temperature to a target temperature and maintains the inner container's internal temperature between the target temperature and a predetermined maximum temperature for a predetermined conversion time sufficient to convert the one or more plastic bags inside the inner container to a plastic block; and terminating, by the control unit of the control panel, the supply of electric power to the one or more heating elements after the predetermined conversion time has elapsed.

In some implementations, the control unit supplies power to the one or more heating elements at a temperature and for a conversion time sufficient to convert the convert the one or more plastic bags inside the inner container to a plastic block without melting the material of one or more plastic bags.

In some implementations, the target temperature is at least 175 degrees Fahrenheit and the predetermined maximum temperature is less than 259 degrees Fahrenheit.

A further aspect features a method, which includes receiving one or more plastic bags in an inner container of a device that has an outer container in which the inner container is situated, one or more heating elements located between the exterior of the inner container and the interior of the outer container, and a control panel disposed to the exterior of the outer container or the exterior of the outer lid. In response to a user input to the device in certain implementations, the control unit of the control panel initiates a third conversion cycle in which electric power is supplied to the one or more heating elements so that the one or more heating elements raise the inner container's internal temperature to the target temperature and maintains the inner container's internal temperature at a minimum of the target temperature. In response to a second user input, the control unit of the control panel terminates the supply of electric power to the one or more heating elements before the predetermined conversion time has elapsed.

Another aspect features a method, which includes receiving one or more plastic bags in an inner container of a device. The inner container of the device has an opening and includes an inner lid configured to cover the opening. The plastic converter also includes an outer container in which the inner container is situated that has an outer lid configured to close over the inner lid, one or more heating elements located between the exterior of the inner container and the interior of the outer container, a control panel disposed to the exterior of the device or the exterior of the outer lid, and a display screen disposed to the exterior of the device or the exterior of the control panel. In response to a user input to the device, a control unit of the control panel detects whether the outer lid is closed and whether the inner lid is closed. In response to detecting that the outer lid and inner lid are both closed, the control unit of the control panel causes the outer lid and the inner lid to lock. The control unit of the control panel initiates a conversion cycle in which electric power is supplied to the one or more heating elements so that the one or more heating elements raise the inner container's internal temperature to a target temperature and maintains the inner container's internal temperature at a minimum of the target temperature for a predetermined conversion time sufficient to convert the one or more plastic bags inside the inner container to a recyclable plastic block. The control unit of the control panel terminates the supply of electric power to the one or more heating elements after the predetermined conversion time has elapsed and causes the outer lid and the inner lid to unlock in response to determining that the inner container's internal temperature has cooled to a base temperature.

An additional aspect features a method, which includes receiving one or more plastic bags in an inner container of a device. The inner container of the device has an opening and includes an inner lid configured to cover the opening. The plastic converter also includes an outer container in which the inner container is situated that has an outer lid configured to close over the inner lid, one or more heating elements located between the exterior of the inner container and the interior of the outer container, a control panel disposed to the exterior of the device or the exterior of the outer lid, and a display screen disposed to the exterior of the device or the exterior of the control panel. In response to a user input to the device, in some implementations, the control unit of the control panel detects whether the outer lid is closed and whether the inner lid is closed. In response to detecting that the outer lid and inner lid are both closed, the control unit of the control panel causes the outer lid and the inner lid to lock. The control unit of the control panel initiates a second conversion cycle in which electric power is supplied to the one or more heating elements so that the one or more heating elements raise the inner container's internal temperature to a target temperature and maintain the inner container's internal temperature between the target temperature and a predetermined maximum temperature for a predetermined conversion time sufficient to convert the one or more plastic bags inside the inner container to a plastic block. The control unit of the control panel terminates the supply of electric power to the one or more heating elements before the predetermined conversion time has elapsed in response to determining that the inner container's internal temperature exceeds a threshold temperature. The control unit of the control panel causes the outer lid and the inner lid to unlock in response to determining that the inner container's internal temperature has cooled to a base temperature.

Another aspect features a method, which includes receiving one or more plastic bags in an inner container of a device. The inner container of the device has an opening and includes an inner lid configured to cover the opening. The plastic converter also includes an outer container in which the inner container is situated that has an outer lid configured to close over the inner lid, one or more heating elements located between the exterior of the inner container and the interior of the outer container, a control panel disposed to the exterior of the device or the exterior of the outer lid, and a display screen disposed to the exterior of the device or the exterior of the control panel. In response to a user input to the device in certain implementations, the control unit of the control panel detects whether the outer lid is closed and whether the inner lid is closed. In response to detecting that the outer lid and inner lid are both closed, the control unit of the control panel causes the outer lid and the inner lid to lock. The control unit of the control panel initiates a third conversion cycle in which electric power is supplied to the one or more heating elements so that the one or more heating elements raise the inner container's internal temperature to a target temperature and maintain the inner container's internal temperature at a minimum of the target temperature. The control unit of the control panel terminates the supply of electric power to the one or more heating elements before the predetermined conversion time has elapsed in response to a second user input and causes the outer lid and the inner lid to unlock in response to determining that the inner container's internal temperature has cooled to a base temperature.

Another aspect features a method, which includes receiving one or more plastic bags in an inner container of a device. The inner container of the device has an opening and includes an inner lid configured to cover the opening. The plastic converter also includes an outer container in which the inner container is situated that has an outer lid configured to close over the inner lid, one or more heating elements located between the exterior of the inner container and the interior of the outer container, a control panel disposed to the exterior of the device or the exterior of the outer lid, and a display screen disposed to the exterior of the device or the exterior of the control panel. In response to a user input to the device in some implementations, the control unit of the control panel detects whether the outer lid is closed and whether the inner lid is closed. In response to determining that the outer lid is not closed, the inner lid is not closed, or both the outer lid and inner lid are not closed, the control unit of the control panel causes an error message to be indicated on the display screen.

In another aspect, a method includes: opening an outer lid of an outer container of a device; after opening the outer lid, placing one or more plastic bags in an inner container of the device, the inner container being situated within the outer container and defining an opening, wherein the inner lid is configured to substantially cover the opening, and the outer lid of the outer container is configured to cover the inner lid; after placing the one or more plastic bags in the inner container, closing the outer lid; operating the device to initiate a conversion of the one or more plastic bags inside the inner container to a plastic block; after operating the device to initiate the conversion, waiting for (i) a predetermined conversion time sufficient for the device to convert the one or more plastic bags inside the inner container to a plastic block and (ii) a cooling period for the inner container to cool to or below a predetermine temperature; after the conversion time and the cooling period, opening the outer lid; and after opening the outer lid, opening the inner lid.

In some implementations, the method includes removing the plastic block from the inner container; closing the inner lid; and closing the outer lid.

In some implementations, the inner container comprises a removable silicone liner that lines the interior walls of the inner container, and the method further comprising: lifting the removable silicone layer from inner container with the plastic block within the removable silicone liner; and removing the plastic block from the removable silicone liner.

In some implementations, the inner lid defines an opening that extends through the inner lid and provides a passage through the opening of the inner container while the inner lid is closed, wherein placing the one or more plastic bags in the inner container of the device comprises inserting the one or more plastic bags through the opening in the inner lid into the inner container.

In some implementations, the method includes, after opening the outer lid, opening the inner lid; placing the one or more plastic bags in the inner container of the device comprises inserting the one or more plastic bags through the opening in the inner container with the inner lid and outer lid open; and the method includes after inserting the one or more plastic bags, closing the inner lid.

Another aspect features a recyclable plastic block formed by one or more of the aforementioned methods.

DETAILED DESCRIPTION

Figure 1:
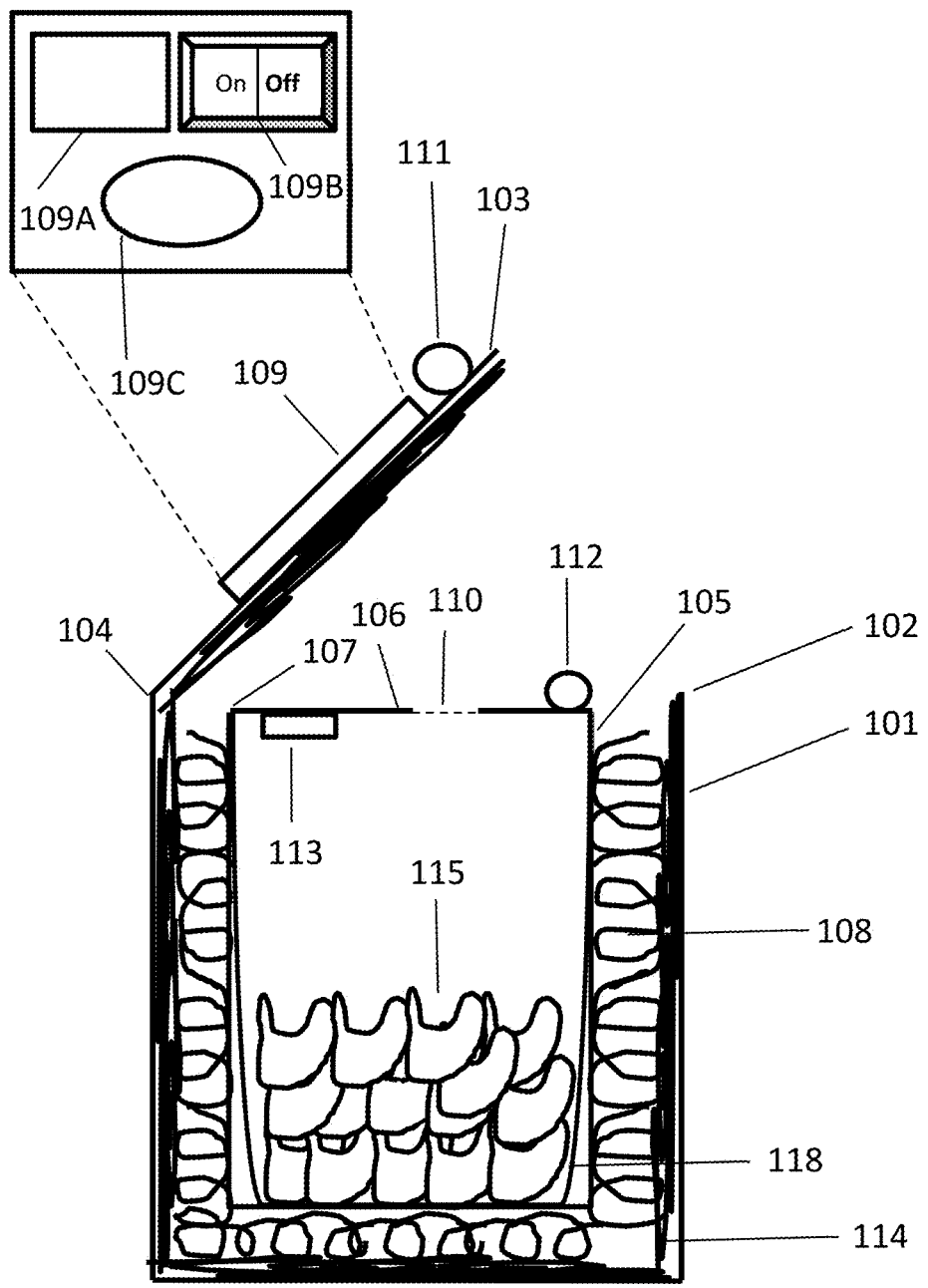
FIG. 1 is a cutaway illustration of a plastic bag converter with the outer lid open and with plastic bags located within the inner container, before electric power is supplied to a heating element.

Referring to FIG. 1, a plastic bag converter 101 includes an outer container 102 that has an outer lid 103. The outer lid 103 may be connected to the outer container 102 with an outer lid hinge 104. An inner container 105 is situated within the outer container 102. An inner lid 106 may be connected to the inner container 105 with an inner lid hinge 107. The walls of the inner container 105 may be substantially planar and formed of metal. In some implementations, the walls of the inner container 105 are arranged so that the inner container 105 has a substantially rectangular cross-section, so that the inner container 105 condenses plastic bags to form a substantially rectangular block, e.g., with substantially planar sides oriented approximately perpendicular to each other. Of course, the converter 101 may have an inner container 105 of other shapes to mold plastic bags into other shapes.

One or more heating elements, referred to simply as a heating element 108, which may be an electromagnetic coil, is located in between the exterior of the inner container 105 and the interior of the outer container 102, and a control panel 109 is disposed to the exterior of the outer container 102. A series of wires may connect the control panel 109 to the heating element 108. In a particular implementation, the inner lid 106 defines a slit 110 that extends through the inner lid 106 and provides passage to the inner container 105. As noted above, the heating element 108 may be composed of or be implemented using multiple different heating elements, such as different elements placed under or on different sides of the inner container 105.

The heating element 108 may extend under the bottom of the inner container 105 and up along sides of the inner container 105. In some implementations, the heating element 108 extends, from the bottom of the inner container 105, up along a majority of the vertical extent of the sides of the inner container 105. A portion of the heating element 108 can extend along each of the different sides of the inner container 105. In some implementations, the heating element extends substantially along the entire vertical extent of the inner container, along one or more or even all sides of the inner container. The heating element 108 may surround the inner container 105, for example, having portions or elements placed at intervals about the inner container 105, or extending one or more times around the exterior of the inner container 105.

The plastic bag converter may include an outer lid sensor 111 which can detect whether the outer lid 103 is closed. In some implementations, the outer lid sensor 111 is located on the outward-facing portion of the outer lid 103. Similarly, the plastic bag converter may include an inner lid sensor 112 which can detect whether the inner lid 106 is closed. In some implementations, the inner lid sensor 112 is located on the outward-facing portion of the inner lid 106. In some implementations, the inner lid 106 may be operatively connected to the outer lid 103 such that the outer lid sensor 111 can detect if both the outer lid 103 and the inner lid 106 are closed, in which case a separate inner lid sensor 112 may be omitted.

The plastic bag converter 101 may also include a timer 109A, which may be located on the exterior of the outer container 102. An on/off control 109B may serve to initiate the supply of electric power from the control panel 109 to the heating element 108 in response to a user input, and may also serve to terminate the supply of electric power from the control panel 109 to the heating element 108 in response to a second user input. In a particular implementation, the on/off control 109B is an "on"/"off" switch.

In some implementations, the plastic bag converter 101 includes a temperature sensor 113, which may be located on the interior of the inner lid 106, to measure the temperature of the inner container 105. The plastic bag converter 101 may also include a display screen 109C, which may be located on the control panel 109 or on another portion of the exterior of the outer container 102.

In some implementations, the inner container 105 rests directly on the floor of the outer container 102. In other implementations, a layer of insulating material 114, which may serve as a safety mechanism to ensure that the outer container 102 does not heat to a temperature that is dangerous for a user to touch, is located in between the heating element 108 and the outer container 102 and on the interior of the outer lid 103. In these implementations, the inner container 105 rests on the portion of the insulating material 114 that lines the floor of the outer container 102. Insulating material 114 also lines the sides and even the inner portion of the outer lid 103. In some implementations, there is a space defined between the heating element 108 and the outer container 102, substantially or entirely surrounding the inner container 105, and the insulating material may be located in this space. The space between the heating element 108 and the inner surface of the outer container may be, for example, at least one half an inch, and may be greater, such as one inch, two inches, three inches, or more. The insulating material 114 may be placed in the space and may partially or completely fill the space. In some implementations, the insulating material extends partially or completely along all interior surfaces of the outer container 102. In some implementations, at least one half of an inch of insulation is included, and other implementations, may include insulating material 114 of a thickness of 1, 2, 3 or more inches. The insulating material 114 may be composed of fiberglass, for example woven fiberglass. The insulating material 114 may also be composed of alkaline earth silicate (AES) fiber such as Superwool® Plus.

Figure 2:
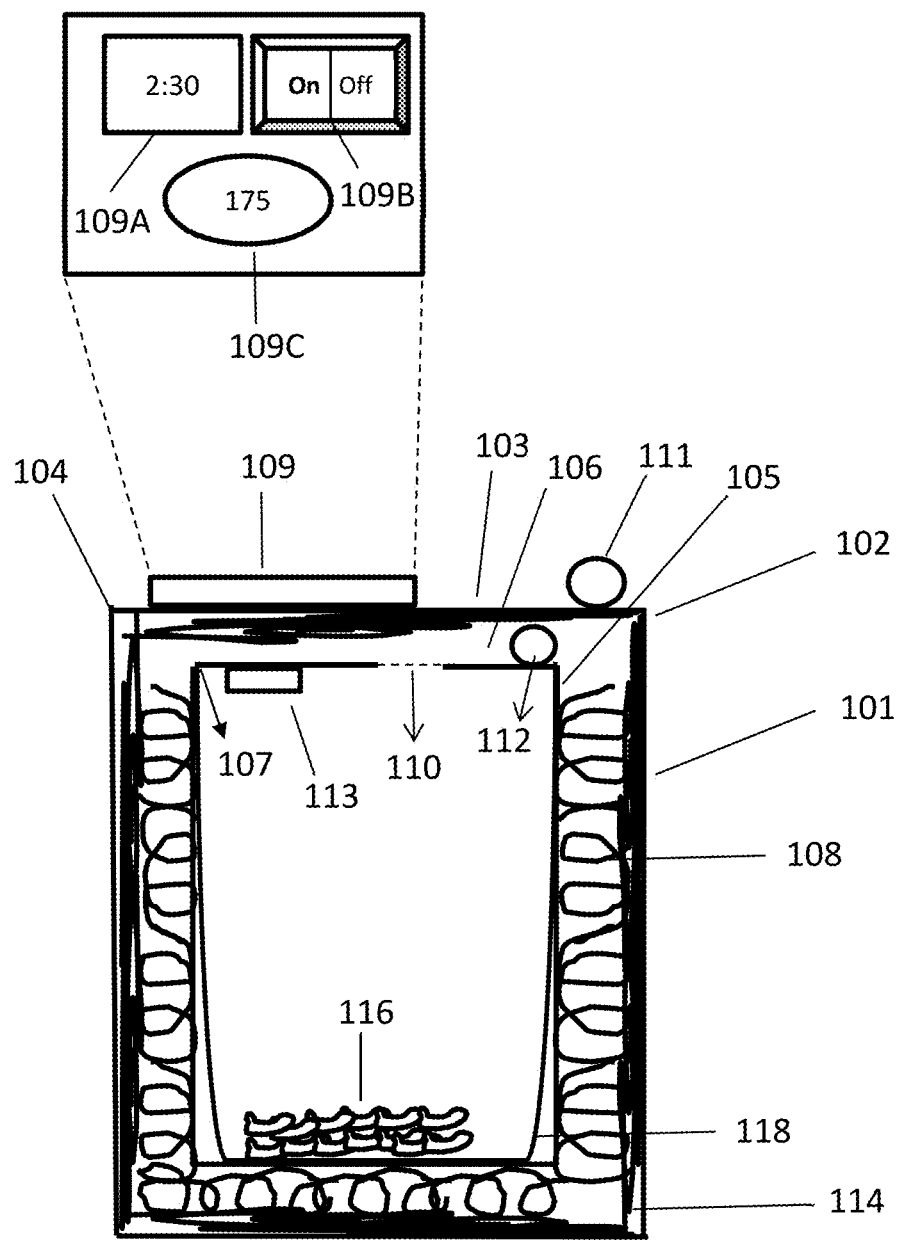
FIG. 2 is a cutaway illustration of the plastic bag converter with the outer lid closed and partially converted plastic bags located within the inner container, while electric power is being supplied to the heating element.
Figure 3:
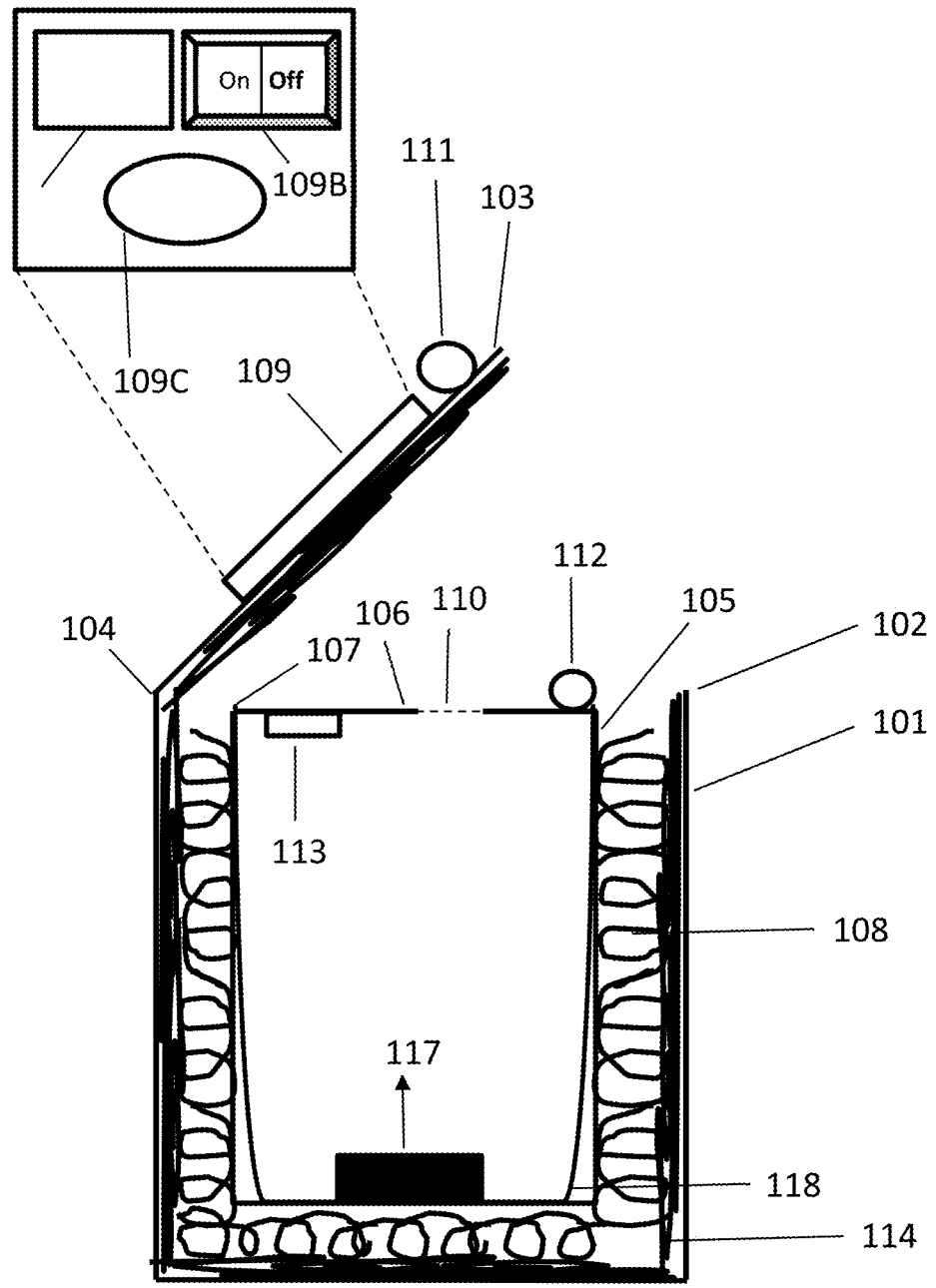
FIG. 3 is a cutaway illustration of the plastic bag converter with the outer lid open and a fully converted recyclable plastic block located within the inner container, after electric power is supplied to the heating element.

The operation of the plastic bag converter 101 during the conversion process is described. A user opens the outer lid 103 of the outer container 102 and the inner lid 106 of the inner container 105 in order to insert one or more plastic bags 115 into the inner container 105. After inserting one or more plastic bags 115 into the inner container 105, the user closes the inner lid 106 and the outer lid 103. FIG. 2 shows partially converted plastic bags 116, which are in the process of being converted to a recyclable plastic block 117, as seen at the end of the conversion process in FIG. 3.

In order to begin the conversion process, the user activates the on/off control 109B. In the implementations in which the on/off control 109B is an "on"/"off" switch, the user flips the switch to the "on" setting to initiate the supply of electric power. In response to the on/off control 109B being activated, the plastic bag converter 101 provides power to a control unit of the control panel 109, which initiates the supply of electric power from the control panel 109 to the heating element 108. The heating element 108 begins to heat up, thereby heating the inner container 105 in which one or more plastic bags 115 are located.

In some implementations, user input to the on/off control 109B does not automatically signal the control unit of the control panel 109 to supply electric power to the heating element 108; rather, it signals the control unit of the control panel 109 to receive information from the outer lid sensor 111, and in some implementations inner lid sensor 112, to determine whether the outer lid 103 and inner lid 106 are respectively closed. The outer lid sensor 111 and the inner lid sensor 112 may be optical sensors, which determine whether the outer lid 103 and the inner lid 106 are closed by sensing the proximity of the lids to each other and the position of the lids relative to the bottom of the inner container 105.

Figure 4A:
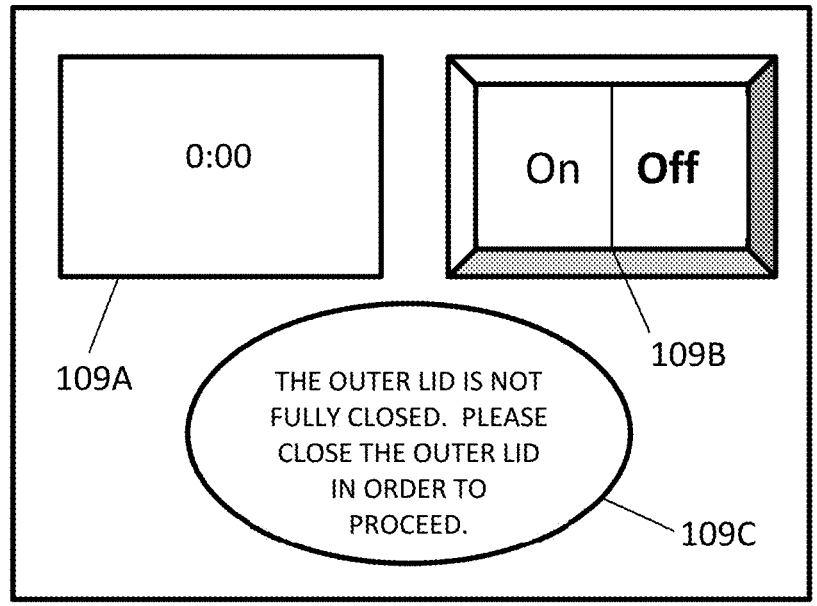
FIG. 4A-4C show views of the control panel of the plastic bag converter.
Figure 4B:
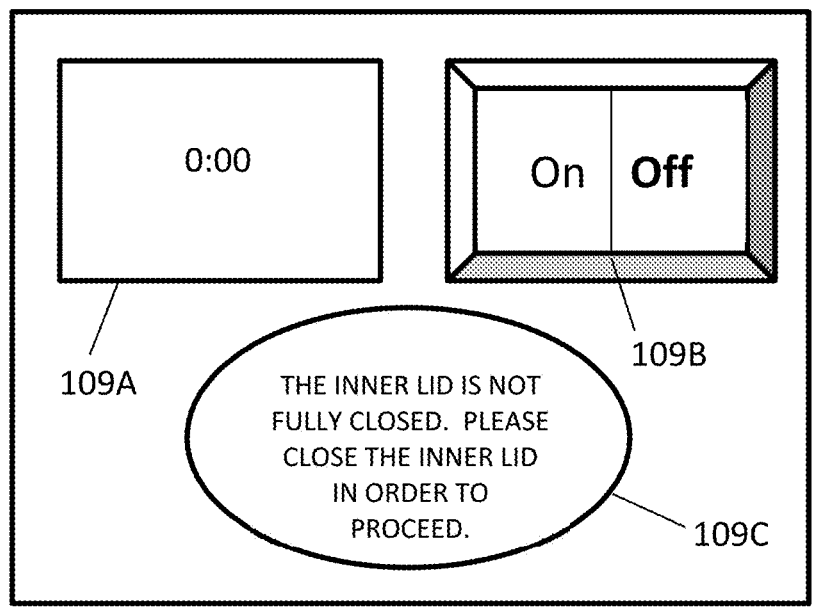

If the outer lid 103 and inner lid 106 are not closed, the control unit of the control panel may cause an error to be indicated on the display screen 109C. As an example, if the outer lid sensor 111 informs the control panel 109 that the outer lid 103 is not closed, the control unit of the control panel 109 causes the display screen 109C to indicate the following message, as shown in FIG. 4A: "THE OUTER LID IS NOT FULLY CLOSED. PLEASE CLOSE THE OUTER LID IN ORDER TO PROCEED." As another example, if the outer lid sensor 111 and/or inner lid sensor 112 informs the control panel 109 that the inner lid 106 is not closed, the control unit of the control panel 109 causes the display screen 109C to indicate the following message, as shown in FIG. 4B: "THE INNER LID IS NOT FULLY CLOSED. PLEASE CLOSE THE INNER LID IN ORDER TO PROCEED". Once the outer lid 103 and the inner lid 106 are closed, the control unit of the control panel 109 locks the outer lid 103 and the inner lid 106 before initiating the supply of electric power to the heating element 108. The outer lid 103 may be caused to lock by the securing of a bolt located at the edge of the outer lid 103 opposite of the outer lid hinge 104. The outer lid 103 may also be caused to lock by the fastening of a bimetallic spring located at the edge of the outer lid 103 opposite of the outer lid hinge 104. The inner lid 106 may be operatively connected to the outer lid 103 such that the locking of the outer lid 103 causes the inner lid 106 to lock as well. The inner lid 106 may also be caused to lock by the securing of a bolt located at the edge of the inner lid 106 opposite of the inner lid hinge 107.

As electric power is supplied from the control panel 109 to the heating element 108, the interior of the inner container 105 is heated to a target temperature. In an exemplary implementation, the target temperature is one hundred seventy-five degrees Fahrenheit. The temperature or temperature ranges that are produced in the inner container 105 may be different depending on the type of polymer material the plastic bag converter 101 is designed to condense. At this temperature, HDPE, the primary component of the one or more plastic bags 115 located within the inner container 105, condenses, causing the one or more plastic bags 115 to be compacted and converted into a recyclable plastic block 117 without releasing unwanted harmful chemical byproducts.

Polymers generally have a maximum continued use temperature, above which the mechanical and structural properties of the material begin to degrade. Of course, it is desirable for the conversion to exceed this maximum continued use temperature so that the polymer material will condense, e.g., deform and compact into a block 117. The plastic bag converter 101 can be designed to maintain, in the inner container 105, a temperature or range of temperatures during the condensing phase of operation that is above the continued use temperature of the polymer and below the melting point of the polymer. For HDPE, the maximum continued use temperature is approximately 149° F. and the melting point is approximately 259° F. For LDPE, the maximum continued use temperature is approximately 149° F. and the melting point is approximately 230° F. Of course, even for HDPE and LDPE, different densities and different variants will have different properties. Nevertheless, the plastic bag converter 101 can be configured to generate a temperature or range of temperatures between Increasing the conversion temperature or temperature range will generally increase the speed that the plastic bags condense. Limiting the maximum temperature during conversion below the melting point of the polymer material of the plastic bags can allow condensing without melting and releasing unwanted odors and harmful chemical byproducts. In some implementations, the target temperature or temperature range maintained during the condensation portion of a conversion cycle is defined to have a predetermined margin (e.g., amount of degrees, such as 25° F. or 50° F., or percentage, such as 10%, 15%, 20%, etc.) above the maximum continued use temperature and/or a predetermined margin (e.g., amount of degrees, such as 1° F., 5° F., 10° F., etc., or percentage, such as 1%, 5%, 10%, etc.) below the melting temperature of one or more polymer materials that the plastic bag converter 101 is designed to process. In some implementations, the target temperature represents an average temperature during a condensing portion of a conversion cycle, with the control electronics of the plastic bag converter 101 maintaining the absolute temperature within a margin, such as +/−10%, of the target temperature over the condensing portion of the conversion cycle.

In some implementations, the control panel 109 has different conversion cycle settings that, when selected by the user, cause the converter 101 to produce different target temperatures or temperature ranges in the inner container 108. These settings may correspond to different types or materials of plastic bags, e.g., so that the user may select one setting for HDPE plastic bags resulting in one temperature level, and another for LDPE plastic bags that produces a second, different temperature level (e.g., a temperature level that is lower, given the lower melting point of LDPE). Another setting may be provided with a temperature level for linear LDPE. Thus, the plastic bag converter 101 may be used to perform different conversion cycles based on the setting corresponding to the type of plastic bags 115 being placed into the inner container 105. Similarly, the conversion cycles for different materials may have different durations or other properties. Of course, in some implementations, the plastic bag converter 101 may have a single setting or single type of conversion cycle, for example, designed to condense plastic bags made of a particular type of material, or designed with a temperature sufficient to condense, without melting, material of each of multiple common types of plastic bags.

The control electronics of the plastic bag converter may adjust the temperature within the inner container 105 to a desired temperature or within a desired temperature range by adjusting the voltage and/or current to the heating element 108, and additionally or alternatively by cycling power to the heating element 108 on and off. The control electronics may adjust the heat produced by the heating element 108 with feedback based on the output of a temperature sensor. Alternatively, given known response characteristics of the heating element 108, control electronics may provide a predetermined power level or pattern of power output to the heating element 108 to cause the heating element 108 to produce the desired temperatures in the inner container 105.

As the inner container 105 is being heated in a particular implementation, the control unit of the control panel 109 may receive input from the timer 109A, which measures the amount of time that elapses while electric power is being supplied to the heating element 108. The control unit of the control panel 109 determines that the internal temperature of the inner container 105 has reached the target temperature when the elapsed time is equivalent to a pre-calculated amount of time necessary for the heating element 108 to raise the internal temperature of the inner container 105 from room temperature to the target temperature. In other implementations, the control unit of the control panel 109 receives information from the temperature sensor 113 in order to determine when the internal temperature of the inner container 105 has reached the target temperature. The control unit of the control panel 109 may cause the internal temperature of the inner container 105 to be indicated on the display screen 109C during the conversion process.

Once the target temperature is reached, and unless the supply of electric power is prematurely terminated, the control unit of the control panel 109 continues to supply electric power to the heating element 108 so that the internal temperature of the inner container 105 is maintained at minimum of the target temperature for a time period sufficient to convert the one or more plastic bags 115 to the desired recyclable plastic block 117. The control unit of the control panel 109 either prematurely terminates the supply of electric power, as further described below, or terminates the supply of electric power once the sufficient conversion time has elapsed.

In response to being activated in some implementations, the on/off control 109B enables electricity to flow from the wires attached to the control panel 109 to the heating element 108. Electricity may be supplied to the plastic bag converter 101 via a power cord attached at one end to the plastic bag converter 101 and at the other end to a wall outlet. The control unit of the control panel 109 receives information from the temperature sensor 113 in order to determine the internal temperature of the inner container 105, and supplies electric power until the inner container's internal temperature slightly exceeds the target temperature. Once the inner container's internal temperature cools to the target temperature, the control unit of the control panel 109 again initiates the supply of electric power to the heating element 108, and the process repeats until the predetermined conversion time has elapsed. In implementations that do not include the temperature sensor 113, the control unit of the control panel 109 may start and stop the supply of electric power in accordance with a predetermined pattern. In these implementations, the control unit of the control panel 109 determines the amount of time that has elapsed while electric power is and is not being supplied to the heating element 108 by receiving a set of time data while electric power is being supplied to the heating element 108, and a second set of time data while electric power is not being supplied to the heating element 108.

Figure 4C:
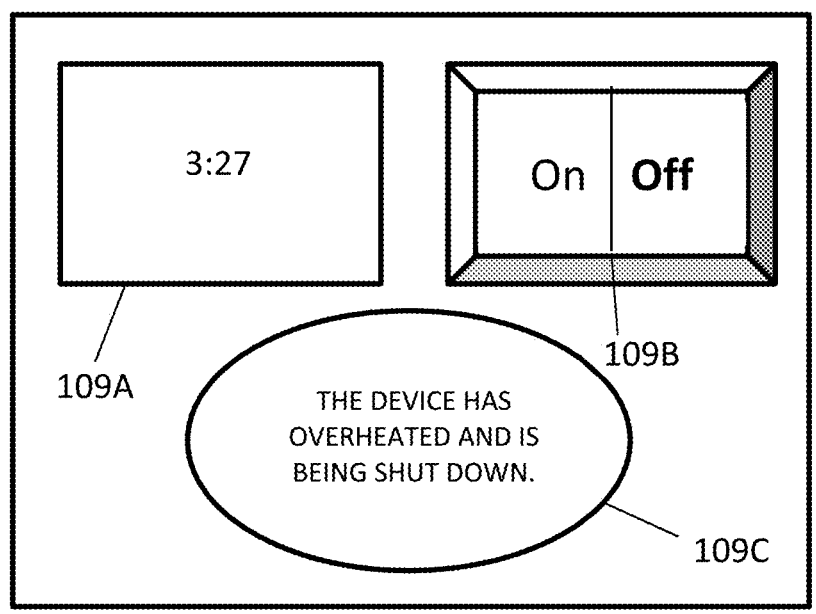
Figure 5:
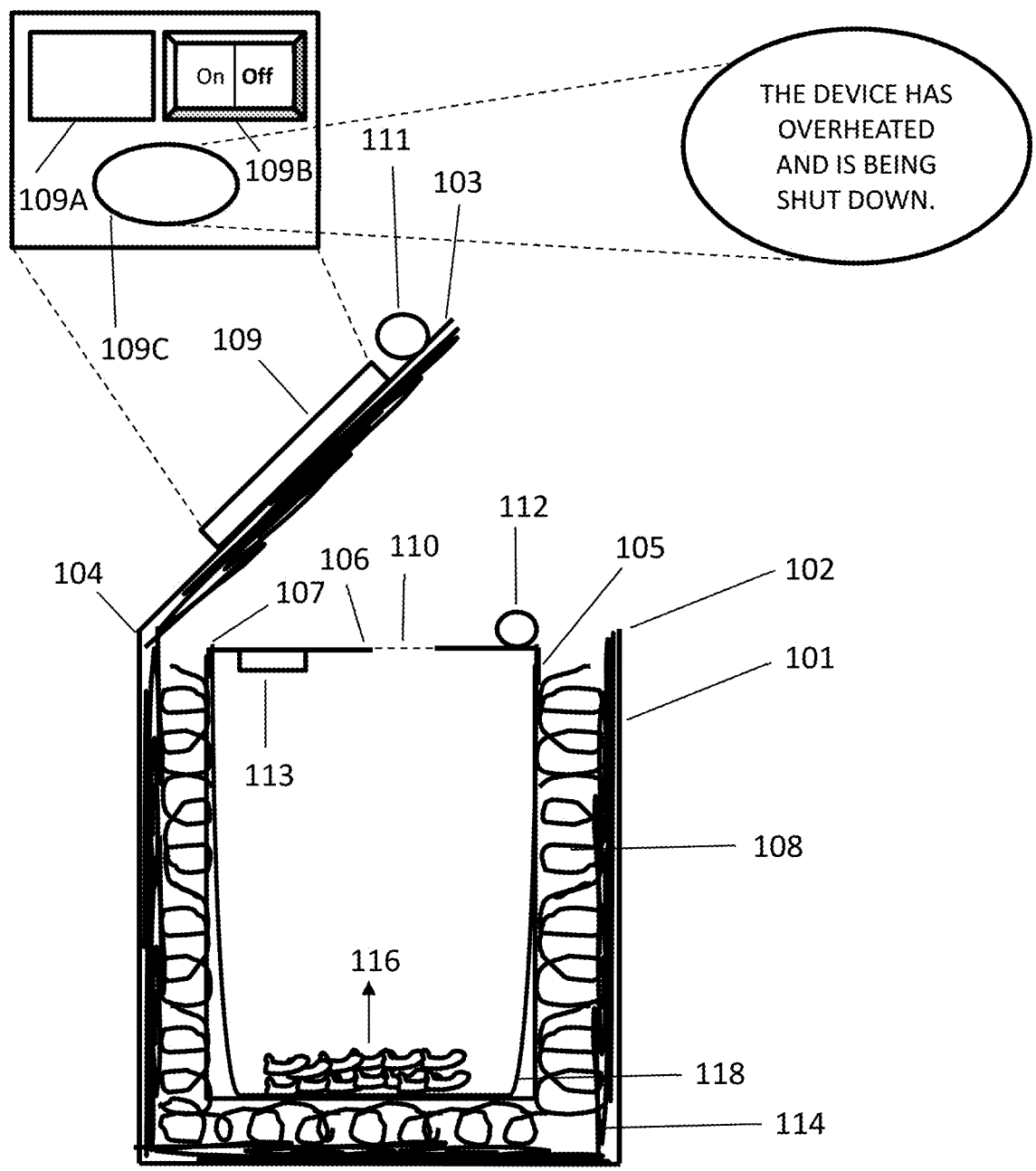
FIG. 5 is a cutaway illustration of the plastic bag converter with the outer lid open and partially converted plastic bags located within the inner container, after the supply of electric power to the heating element is prematurely terminated in response to the plastic bag converter's overheating.

The temperature sensor 113 may serve as a safety mechanism during the conversion process in certain implementations. The control unit of the control panel 109 receives temperature data from the temperature sensor 113 whenever electric power is being supplied to the heating element 108. If the temperature of the inner container 105 is higher than a threshold temperature at which the plastic bag converter 101 may break down or pose harm to the user, the control unit of the control panel 109 will prematurely terminate the supply of electric power to the heating element 108, and may cause an error message to be indicated on the display screen 109C, as shown in FIG. 4C and FIG. 5, such as, "THE DEVICE HAS OVERHEATED AND IS BEING SHUT DOWN." If the supply of electric power to the heating element 108 is prematurely terminated, the conversion process will be stopped, resulting in partially converted plastic bags 116, as shown in FIG. 5.

At any time during the conversion process in some implementations, the user may activate the on/off control 109B before the predetermined conversion time has elapsed in order to prematurely terminate the supply of electric power to the heating element 108, resulting in partially converted plastic bags 116. In the implementation in which the on/off control 109B is an "on"/"off" switch, the user flips the switch to the "off" setting to terminate the supply of electric power.

When the control unit of the control panel 109 terminates the supply of electric power from the control panel 109 to the heating element 108 in certain implementations, the control unit of the control panel 109 causes the outer lid 103 and the inner lid 106 to remain locked until the inner container 105 has cooled to a safe base temperature. In implementations without the temperature sensor 113, the control unit of the control panel 109 receives input from the timer 109A, which measures the amount of time that elapses once electric power stops being supplied to the heating element 108. The control unit of the control panel 109 determines that the base temperature is reached when the elapsed time is equivalent to a pre-calculated amount of time necessary for the inner container 105 to cool from the target temperature to the base temperature. In implementations which include the temperature sensor 113, the control unit of the control panel 109 is informed when the base temperature is reached by the temperature sensor 113. After the base temperature is reached, the control unit of the control panel 109 causes the outer lid 103 and inner lid 106 to unlock. In some implementations, unlocking of the outer lid 103 is caused by the unfastening of a bolt located at the end of the outer lid 103 opposite of the outer lid hinge 104. The outer lid 103 may also be unlocked by the unfastening of a bimetallic spring located at the edge of the outer lid 103 opposite of the outer lid hinge 104. The inner lid 106 may be operatively connected to the outer lid 103 such that the unlocking of the outer lid 103 causes the inner lid 106 to unlock as well. The inner lid 106 may also be caused to unlock by the unfastening of a bolt located at the edge of the inner lid 106 opposite of the inner lid hinge 107.

Figure 6:
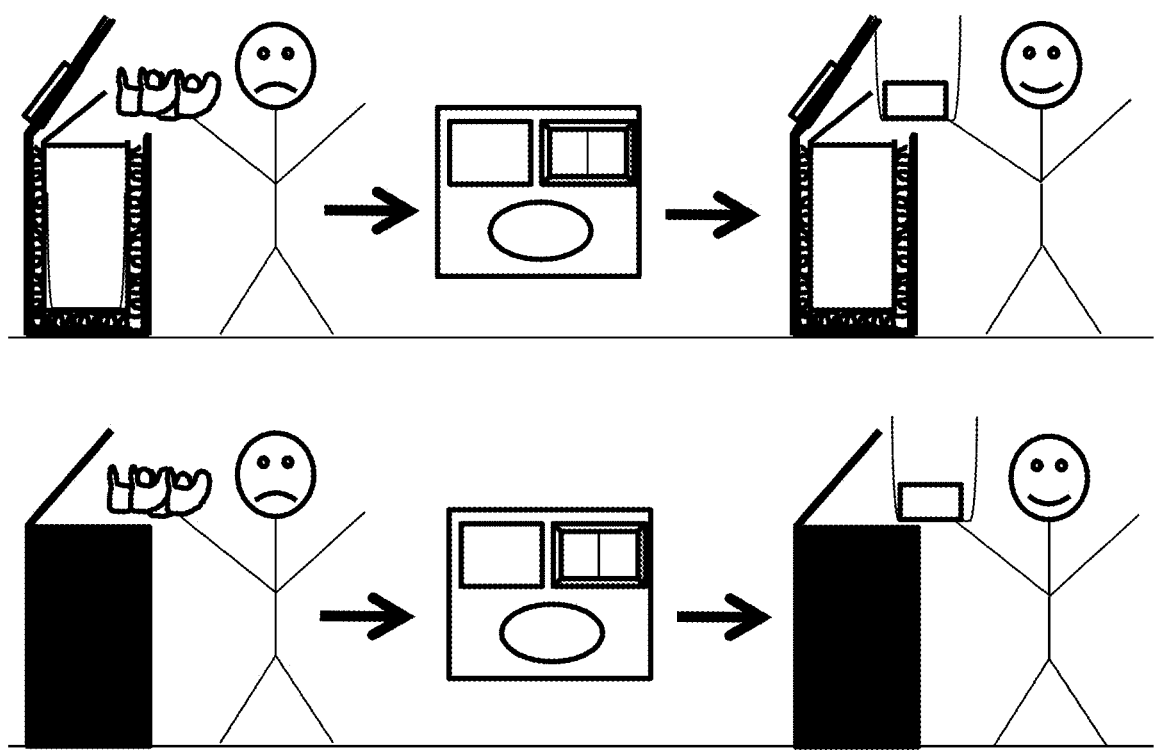
FIG. 6 shows a user operating the apparatus described in this application. The apparatus is shown both from an outside view and a cutaway view.

After the outer lid 103 and inner lid 106 are unlocked, the user opens the outer lid 103 and the inner lid 106 and removes from the inner container 105 the recyclable plastic block 117, as shown in FIG. 6, or partially converted plastic bags 116.

A removable silicone layer 118 may line the interior of the inner container 105, e.g., as an integral liner configured to extend along the sides and bottom of the inner container 105. As illustrated in FIG. 6, the silicone layer 118 facilitates retrieval of the plastic block 117. By removing the silicone layer 118 with the plastic block 117 inside, the user can remove the recyclable plastic block 117 from the inner container 105 without having to reach into the bottom of the inner container 105 by lifting the ends of the silicone layer 118. The silicone layer 118 also helps to prevent plastic residue buildup on the bottom or walls of the inner container 105.

Figure 7:
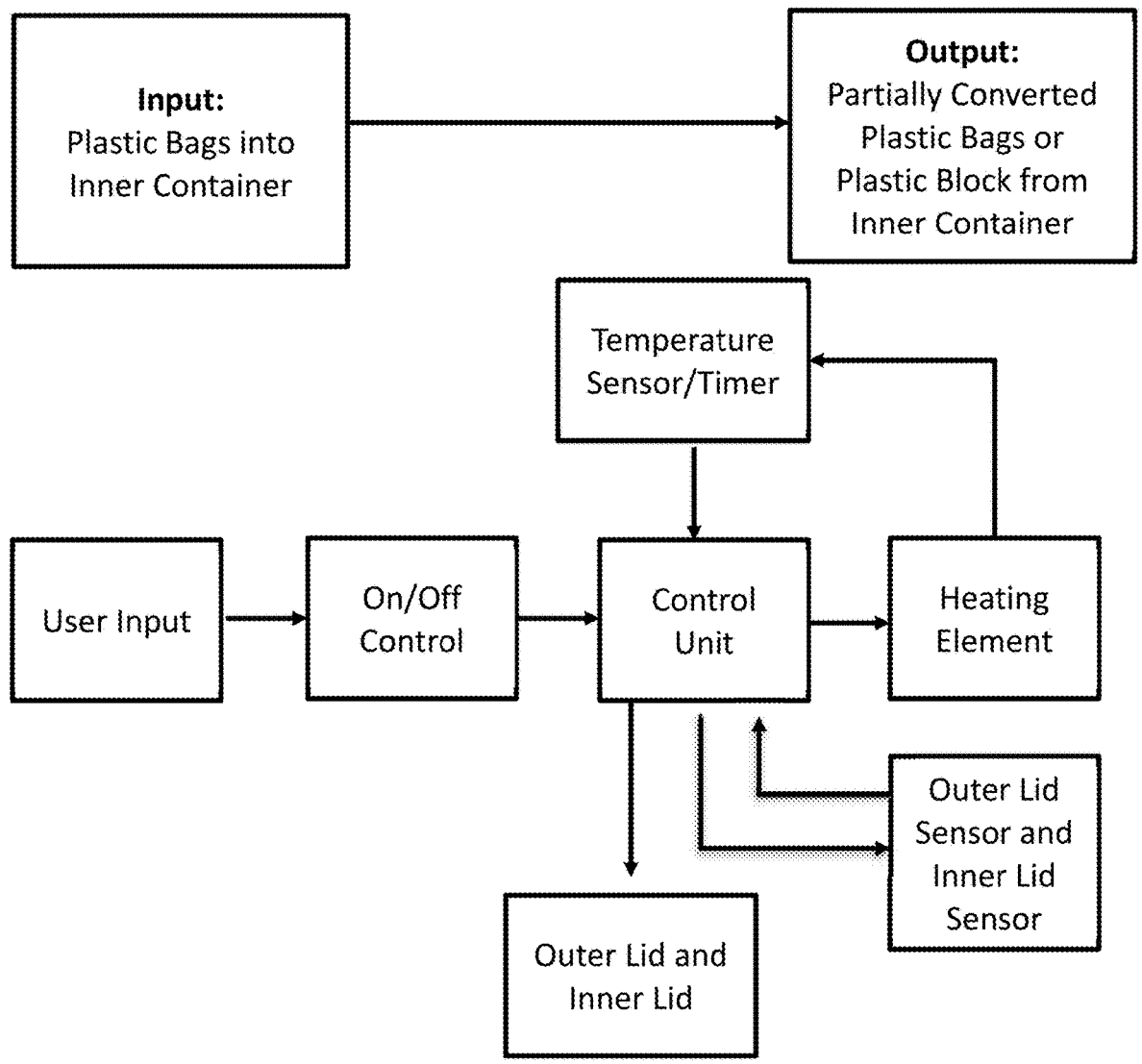
FIG. 7 is a block diagram showing the relationship between the primary components of the plastic bag converter, along with the input and output of the conversion process.

Referring to FIG. 7 as a general overview of the conversion process, the control unit of the control panel initiates the conversion process by supplying electric power to the heating element, after being signaled by the on/off control in response to a user input. Once the target temperature is reached, the control unit of the control panel terminates the supply of electric power to the heating element after the predetermined conversion time has elapsed, after the inner container's temperature exceeds a threshold temperature, or after being signaled by the second on/off control, whichever occurs first. The outer lid sensor, and in some implementations the and inner lid sensor, inform the control unit of the control panel if the outer lid and inner lid are respectively closed. If the lids are closed, the control unit of the control panel locks the lids before initiating the supply of electric power, and unlocks the outer lid and the inner lid after terminating the supply of electric power. The heating element in turn controls the inner container's internal temperature. The internal temperature is monitored by the temperature sensor, which relays such information back to the control unit of the control panel. The required input of the conversion is one or more plastic bags, which are placed into the inner container, and the output of the conversion is the recyclable plastic block 117, which is removed from the inner container.

Other implementations are within the scope of the following claims.

What is claimed is:
1. A method, comprising:
receiving one or more plastic bags in an inner container of a device, the inner container having an exterior, a top, a bottom, and a plurality of sides extending upward along a length from the bottom of the inner container to the top of the inner container, wherein the device comprises:
an outer container having an interior in which the inner container is situated, the outer container having a lid;
one or more heating elements located between the exterior of the inner container and the interior of the outer container, wherein the one or more heating elements extend (i) along the bottom of the inner container and (ii) along the sides of the inner con- tainer over a portion that includes a majority of the length of the sides from the bottom to the top of the inner container; and a control panel disposed at an exterior of the outer container or at the lid of the outer container, wherein the control panel is in communication with a control unit configured to supply electric power to the heating element;

in response to a user input to the device, initiating, by the control unit, a conversion cycle in which electric power is supplied to the one or more heating elements so that the one or more heating elements raise the inner container's internal temperature to a target temperature and maintain the inner container's internal temperature between the target temperature and a predetermined maximum temperature for a predetermined conversion time sufficient to convert the one or more plastic bags inside the inner container to a plastic block; and terminating, by the control unit, supply of electric power to the one or more heating elements after the predetermined conversion time has elapsed.

2. The method of claim 1, wherein the control unit supplies power to the one or more heating elements at a temperature and for a conversion time sufficient to convert the one or more plastic bags inside the inner container to a plastic block without melting the one or more plastic bags.

3. The method of claim 1, wherein the target temperature is at least 175 degrees Fahrenheit and the predetermined maximum temperature is less than 259 degrees Fahrenheit.

4. The method of claim 1, further comprising:
receiving one or more plastic bags in the inner container;
in response to a second user input to the device, initiating, by the control unit, a second conversion cycle in which electric power is supplied to the one or more heating elements so that the one or more heating elements raise the inner container's internal temperature to the target temperature and maintains the inner container's internal temperature between the target temperature and the predetermined maximum temperature; and
terminating, by the control unit, the supply of electric power to the one or more heating elements before the predetermined conversion time has elapsed in response to determining that the inner container's internal temperature exceeds a threshold temperature.

5. The method of claim 1, further comprising:
receiving one or more plastic bags in the inner container;
in response to a third user input to the device, initiating, by the control unit, a third conversion cycle in which electric power is supplied to the one or more heating elements so that the one or more heating elements raise the inner container's internal temperature to the target temperature and maintain the inner container's internal temperature between the target temperature and the predetermined maximum temperature; and
terminating, by the control unit, the supply of electric power to the one or more heating elements before the predetermined conversion time has elapsed in response to a fourth user input.

6. A method, comprising:
opening an outer lid of an outer container of a device;
after opening the outer lid, opening an inner lid of an inner container of the device and placing one or more plastic bags in the inner container of the device, the inner container being situated within the outer container and defining an opening that receives the one or more plastic bags, wherein the inner lid is configured to substantially cover the opening of the inner container, and the outer lid of the outer container is configured to cover the inner lid, wherein the inner container has a top, a bottom, and a plurality of sides extending upward along a length from the bottom of the inner container to the top of the inner container;

after placing the one or more plastic bags in the inner container, closing the inner lid and then closing the outer lid; and operating the device to initiate a conversion of the one or more plastic bags inside the inner container to a plastic block, wherein the device includes one or more heating elements, and wherein the one or more heating elements extend (i) along the bottom of the inner container and (ii) along the sides of the inner container over a portion that includes a majority of the length of the sides from the bottom to the top of the inner container;

after operating the device to initiate the conversion, waiting for (i) a predetermined conversion time sufficient for the device to convert the one or more plastic bags inside the inner container to a plastic block and (ii) a cooling period for the inner container to cool to or below a predetermined temperature;

after the conversion time and the cooling period, opening the outer lid; and after opening the outer lid, opening the inner lid.

7. The method of claim 6, further comprising:
removing the plastic block from the inner container;
closing the inner lid; and
closing the outer lid.

8. The method of claim 6, wherein the inner container comprises a removable silicone liner that lines interior walls of the inner container, the method further comprising:
lifting the removable silicone liner from inner container with the plastic block within the removable silicone liner; and
removing the plastic block from the removable silicone liner.

9. The method of claim 1, wherein the device further comprises a removable silicone liner located at an interior of the inner container, wherein the removable silicone liner extends along the bottom of the inner container and the sides of the inner container, wherein the removable silicone liner separates the one or more plastic bags from the interior of the inner container such that the plastic block is formed in the removable silicone liner during the conversion cycle, and wherein the removable silicone liner is removable from the inner container.

10. The method of claim 1, wherein the lid of the outer container is rotatable about a hinge to open and close the lid over the outer container; and
wherein the device comprises an inner lid configured to cover the top of the inner container, the inner lid further being rotatable about a hinge to open and close the inner lid over the inner container.

11. The method of claim 10, wherein the inner lid defines a slit extending through the inner lid, the slit providing a passage through the inner lid to an opening of the inner container when the inner lid is closed over the inner container.

12. The method of claim 1, wherein the device comprises a lid sensor configured to detect whether the lid of the outer container is closed; and
wherein initiating the conversion cycle is performed in response to determining, based on output of the lid sensor, that the lid of the outer container is closed.

13. The method of claim 1, wherein the device comprises a lid sensor configured to detect whether the lid of the outer container is closed;
    wherein the device comprises a lock configured to lock the lid in a closed position over the outer container; and
    wherein the method comprises, before initiating the conversion cycle, locking the lid closed in response to determining, based on output of the lid sensor, that the lid of the outer container is closed.

14. The method of claim 1, further comprising:
    causing, by the control unit, a lock for the lid to hold the lid in a closed position over the outer container during the conversion cycle;
    after terminating the supply of electric power to the one or more heating elements after the predetermined conversion time, maintaining, by the control unit, the lid locked in the closed position for at least a predetermined cooling time; and
    in response to determining that the predetermined cooling time has elapsed, causing, by the control unit, the lid to be unlocked to enable the lid to be opened by a user.

15. The method of claim 1, wherein the device includes a temperature sensor placed to measure a temperature of the inner container;
    wherein the method further comprises:
        causing, by the control unit, a lock for the lid to hold the lid in a closed position over the outer container during the conversion cycle;
        after terminating the supply of electric power to the one or more heating elements after the predetermined conversion time, monitoring, by the control unit, the temperature of the inner container using output of the temperature sensor while the lid remains locked in the closed position over the outer container;
        determining, by the control unit and based on the output of the temperature sensor, that the temperature of the inner container has fallen to at least a predetermined base temperature that is below the target temperature; and
        in response to determining that the temperature of the inner container has fallen to at least the predetermined base temperature, causing, by the control unit, the lid to be unlocked to enable the lid to be opened by a user.

16. The method of claim 15, wherein the device has a control panel configured to receive user input that selects from among multiple different settings for the conversion cycle, wherein the different settings respectively correspond to different types of plastic materials such that the different settings respectively produce conversion cycles with different temperature levels or different durations of heating configured to condense the corresponding types of plastic materials;
    wherein the method further comprises receiving a user input that specifies a selection, from among the multiple settings, of a setting that corresponds to a particular plastic material; and
    wherein initiating the conversion cycle comprises initiating a conversion cycle that uses a particular temperature level or particular duration of heating corresponding to the selected setting, the conversion cycle applying the particular temperature level or particular duration of heating which is configured to condense plastic bags made of the particular plastic material corresponding to the selected setting.

17. The method of claim 1, wherein the device comprises an insulating material located (i) between the one or more heating elements and an interior wall of the outer container and (ii) on an interior side of the lid.

18. The method of claim 17, wherein the insulating material is formed of fiberglass or an alkaline earth silicate material.

19. A method, comprising:
    receiving one or more plastic bags in an inner container of a device, wherein the inner container has an exterior, a top, a bottom, and a plurality of sides extending upward along a length from the bottom of the inner container to the top of the inner container, wherein the device comprises:
        an outer container having an interior in which the inner container is situated, wherein the outer container has a lid;
        one or more heating elements located between the exterior of the inner container and the interior of the outer container, wherein the one or more heating elements extend (i) along the bottom of the inner container and (ii) along the sides of the inner container over a portion that includes a majority of the length of the sides from the bottom to the top of the inner container; and
        a control panel disposed at an exterior of the outer container or at the lid of the outer container, wherein the control panel is in communication with a control unit configured to supply electric power to the heating element;
    in response to a user input to the device, initiating, by the control unit, a conversion cycle in which electric power is supplied to the one or more heating elements so that the one or more heating elements raise the inner container's internal temperature to a target temperature and maintain the inner container's internal temperature between the target temperature and a predetermined maximum temperature for a predetermined conversion time sufficient to convert the one or more plastic bags inside the inner container to a plastic block; and
    terminating, by the control unit, supply of electric power to the one or more heating elements after the predetermined conversion time has elapsed.

\* \* \* \* \*